Patented Oct. 20, 1936

2,058,019

UNITED STATES PATENT OFFICE 2,058,019

METHOD OF EXTRACTING A SWEET INGREDIENT FROM GLYCYRRHIZA GLABRA (LINN)

Yutaka Ito, Misaki-Cho, Hayashida-Ku, Kobe, Japan, assignor to Kanegafuchi Boseki Kabushiki Kaisha, Tokyo, Japan, a corporation of Japan No Drawing. Application July 12, 1935, Serial No. 31,094

4 Claims. (Cl. 87—28)

This solution extracted from the root of *Glycyrrhiza glabra* (Linn) with water or dilute alkali solution by the known process contains a large quantity of impure matters. Now, the present invention relates to improvements in a method of extracting the sweet ingredient from liquorice or *Glycyrrhiza glabra* (Linn), characterized by adding a suitable quantity of magnesium salt or a substance containing it to said extracted liquor heated whereby only the intermingling non-sweet impurities are precipitated, removing the precipitate by filtration and thus obtaining clear sweet extracted liquor. The object thereof is to obtain simply and economically a sweet seasoning material of excellent quality, which has little smell and dissolves clearly in water, by merely concentrating said purified extracted liquor or treating the same with acid and alkali by the known process.

The liquor extracted from the root of *Glycyrrhiza glabra* (Linn) in a cold or hot state with water or dilute alkali solution under the ordinary or increased pressure contains not only salt of glycyrrhizic acid which is the principal sweet ingredient, but also non-sweet impurities, for example, glycyrrhetin, albuminous and resinous materials, and there is known no simple and economical method of separating such impure matters from the principal sweet ingredient. Now, the inventor having discovered the fact that between these impurities contained in a water solution of magnesium salt and the sweet ingredient of *Glycyrrhiza glabra* (Linn) there is great difference in the precipitating condition, utilizes it to purify the extracted liquor by precipitating only the impure matters from said dilute extracted solution. The following is an example.

With a view to extracting the sweet ingredient from the root of *Glycyrrhiza glabra* (Linn) suficiently and quickly, 10 grams of said root cut into pieces is heated with 150 cubic centimeters of about 0.1% caustic soda solution for three to four hours, preventing the generation of the vapor. Next, magnesium chloride is added slowly to the extracted liquor thus obtained at an elevated temperature till there is no more production of brown precipitate, when the addition is stopped, after which the deodorized clear filtrate obtained by filtering and removing said precipitate is concentrated by the known process, thus obtaining the extract of *Glycyrrhiza glabra* (Linn). Or the principal sweet ingredient, namely glycyrrhizic acid is precipitated by addition of acid to said filtrate. Then, said precipitate is washed well with a small quantity of hot dilute hydrochloric acid and water to show silky lustre in cold water and is neutralized with alkali, thus obtaining the extract or solid body of pure *Glycyrrhiza glabra* (Linn).

I claim:

1. The method of extracting the sweet ingredient from the root of *Glycyrrhiza glabra*, which consists in mixing said root with a caustic soda solution, heating the mixture for a predetermined period while preventing the generation of vapor, adding a magnesium salt to the mixture thereby to cause precipitation of only the non-sweet impurities therefrom, and filtering out the precipitated matter.

2. The method of extracting the sweet ingredient from the root of *Glycyrrhiza glabra*, which consists in mixing said root with a caustic soda solution, in the approximate proportions of 10 grams of root to 150 cubic centimeters of solution heating the mixture for a predetermined period while preventing the generation of vapor, adding a magnesium salt to the mixture thereby to cause precipitation of only the non-sweet impurities therefrom, and filtering out the precipitated matter.

3. The method of extracting the sweet ingredient from the root of *Glycyrrhiza glabra*, which consists in mixing said root with a caustic soda solution, heating the mixture for three to four hours while preventing the generation of vapor, adding a magnesium salt to the mixture thereby to cause precipitation of only the non-sweet impurities therefrom, and filtering out the precipitated matter.

4. The method of extracting the sweet ingredient from the root of *Glycyrrhiza glabra* which consists in mixing said root with a .1% caustic soda solution in the approximate proportions of 10 grams of root to 150 cubic centimeters of solution, heating the mixture for three to four hours while preventing the generation of vapor, adding magnesium chloride to the mixture at a comparatively high temperature thereby to cause precipitation of only the non-sweet impurities therefrom, filtering out the precipitated matter, and concentrating the filtrate.

YUTAKA ITO.